US012513705B2

(12) United States Patent
Lin et al.

(10) Patent No.: US 12,513,705 B2
(45) Date of Patent: Dec. 30, 2025

(54) DEFAULT BEAM ASSUMPTION FOR MULTI-PDSCH SCHEDULING

(71) Applicant: MediaTek Singapore Pte. Ltd., Singapore (SG)

(72) Inventors: Hsien-Ping Lin, San Jose, CA (US); Gyu Bum Kyung, San Jose, CA (US); Jiann-Ching Guey, Hsinchu (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 544 days.

(21) Appl. No.: 17/967,948

(22) Filed: Oct. 18, 2022

(65) Prior Publication Data

US 2023/0132954 A1 May 4, 2023

Related U.S. Application Data

(60) Provisional application No. 63/274,572, filed on Nov. 2, 2021.

(51) Int. Cl.
*H04W 72/23* (2023.01)
*H04L 5/00* (2006.01)

(52) U.S. Cl.
CPC ........... *H04W 72/23* (2023.01); *H04L 5/0053* (2013.01); *H04L 5/0092* (2013.01)

(58) Field of Classification Search
CPC ..... H04W 72/23; H04L 5/0053; H04L 5/0092
See application file for complete search history.

(56) References Cited

U.S. PATENT DOCUMENTS

| 2019/0297603 A1* | 9/2019 | Guo ....................... H04L 5/0051 |
| 2020/0053757 A1* | 2/2020 | Bagheri ................... H04L 5/10 |
| 2020/0077369 A1* | 3/2020 | Zhang ................... H04W 72/51 |
| 2020/0137741 A1* | 4/2020 | Zhou ................... H04B 7/06968 |
| 2020/0221485 A1 | 7/2020 | Cirik et al. |
| 2020/0245333 A1* | 7/2020 | Lin ....................... H04L 1/0026 |

(Continued)

FOREIGN PATENT DOCUMENTS

| WO | WO-2020017905 A1 * | 1/2020 | ............ H04L 27/26 |
| WO | 2021203414 A1 | 10/2021 | |

OTHER PUBLICATIONS

European Serach Report, May 19, 2023, Germany.

(Continued)

*Primary Examiner* — Jael M Ulysse
(74) *Attorney, Agent, or Firm* — Troutman Pepper Locke LLP; Tim Tingkang Xia, Esq.

(57) ABSTRACT

In an aspect of the disclosure, a method, a computer-readable medium, and an apparatus are provided. The apparatus may be a UE. The UE receives, at a time point, DCI scheduling two or more downlink data channels. The UE receives, within a threshold processing time from the time point, a first control signal in a first CORESET according to a first TCI state. The threshold processing time is allocated for the UE to decode the downlink control information. The UE receives, subsequent to the first CORESET, data according to the first TCI state (a) until an end of the threshold processing time when a second CORESET in which the UE is configured to receive a second control signal does not exist in the threshold processing time or (b) until the second CORESET when the second CORESET exists in the threshold processing time.

10 Claims, 14 Drawing Sheets

(56) References Cited

U.S. PATENT DOCUMENTS

| | | | |
|---|---|---|---|
| 2020/0288479 A1* | 9/2020 | Xi | H04L 5/0092 |
| 2021/0045141 A1* | 2/2021 | Lee | H04L 5/0053 |
| 2021/0105749 A1* | 4/2021 | Zhou | H04L 5/0023 |
| 2022/0377784 A1* | 11/2022 | Matsumura | H04W 72/23 |
| 2022/0408475 A1* | 12/2022 | Cirik | H04W 72/23 |
| 2023/0132212 A1* | 4/2023 | Gao | H04L 1/1812 |
| | | | 370/329 |
| 2023/0362950 A1* | 11/2023 | Moon | H04B 7/088 |
| 2023/0389040 A1* | 11/2023 | Yokomakura | H04W 72/1273 |
| 2024/0080874 A1* | 3/2024 | Khoshnevisan | H04L 5/0098 |
| 2024/0154745 A1* | 5/2024 | Lee | H04W 72/23 |

OTHER PUBLICATIONS

3GPP TSG RAN WG1 #99, R1-1912893, Reno, USA, Nov. 18-22, 2019.
Release 17, 3GPP TS 38.133 V17.3.0 (Sep. 2021).
3GPP TS 38.214 V16.7.0, 3rd Generation Partnership Project; Technical Specification Group Radio Access Network; NR; Physical layer procedures for data (Release 16) (Sep. 2021).
3GPP TSG RAN WG1 #101, R1-2003397, e-Meeting, May 25-Jun. 5, 2020.
Taiwan Patent Office, "Office Action", May 11, 2023, Taiwan.
European Serach Report, Mar. 7, 2023, Germany.
3GPP TSG RAN WG1 Meeting #106bis-e, R1-2108785, e-Meeting, Oct. 11-Oct. 19, 2021.
3GPP TSG RAN WG1 #106bis-e, R1-2110525, e-Meeting, Oct. 11-19, 2021, Agenda Item: 8.2.4, Source: Moderator (InterDigital, Inc.), Title: Discussion Summary #3 for Beam Management for new SCSs.
China Patent Office, "Office Action", Jul. 19, 2025, China.

\* cited by examiner

DEFAULT BEAM ASSUMPTION FOR MULTI-PDSCH SCHEDULING

This application claims the benefits of U.S. Provisional Application Ser. No. 63/274,572, entitled "DEFAULT BEAM ASSUMPTION FOR MULTI-PDSCH SCHEDULING" and filed on Nov. 2, 2021, which is expressly incorporated by reference herein in their entirety.

BACKGROUND

Field

The present disclosure relates generally to communication systems, and more particularly, to techniques of receiving multiple physical downlink shared channels (PDSCHs) scheduled by downlink control information (DCI) at a user equipment (UE).

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE receives, at a time point, downlink control information (DCI) scheduling two or more downlink data channels. The UE receives, within a threshold processing time from the time point, a first control signal in a first control resource set (CORESET) according to a first transmission configuration indication (TCI) state. The threshold processing time is allocated for the UE to decode the downlink control information. The UE receives, subsequent to the first CORESET, data according to the first TCI state (a) until an end of the threshold processing time when a second CORESET in which the UE is configured to receive a second control signal does not exist in the threshold processing time or (b) until the second CORESET when the second CORESET exists in the threshold processing time.

In another aspect of the disclosure, a method, a computer-readable medium, and an apparatus are provided. The apparatus may be a UE. The UE receives, at a time point, DCI scheduling two or more downlink data channels each to be received according to two or more TCI states. The UE determines a first set of TCI states from a number of sets of TCI states that are activated at the UE. Each set of the number of sets corresponds to a respective codepoint and the first set has a codepoint that is the lowest among sets of TCI states each containing two or more TCI states. The UE receives, within a threshold processing time from the time point, data according to a first TCI state and a second TCI state both contained in the first set. The threshold processing time is allocated for the UE to decode the downlink control information.

In yet another aspect of the disclosure, a method, a computer-readable medium, and an apparatus are provided. The apparatus may be a UE. The UE receives, at a first time point, first DCI from a first TRP. The UE receives, at a second time point, second DCI from a second TRP from a second TRP. The UE receives, within a first threshold processing time from the first time point, a first control signal in a first CORESET, provided from the first TRP, according to a first TCI state. The first threshold processing time is allocated for the UE to decode the first DCI. The UE receives, within a second threshold processing time from the second time point, a second control signal in a second CORESET, provided from the second TRP, according to a second TCI state. The second threshold processing time is allocated for the UE to decode the second DCI. The UE receives, subsequent to the first CORESET, data according to the first TCI state (a) until an end of the first threshold processing time when a third CORESET in which the UE is configured to receive a third control signal does not exist in the first threshold processing time or (b) until the third CORESET when the third CORESET exists in the first threshold processing time. The UE receives, subsequent to the second CORESET, data according to the second TCI state (a) until the end of the second threshold processing time when a fourth CORESET in which the UE is configured to receive a fourth control signal does not exist in the second threshold processing time or (b) until the fourth CORESET when the fourth CORESET exists in the second threshold processing time.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
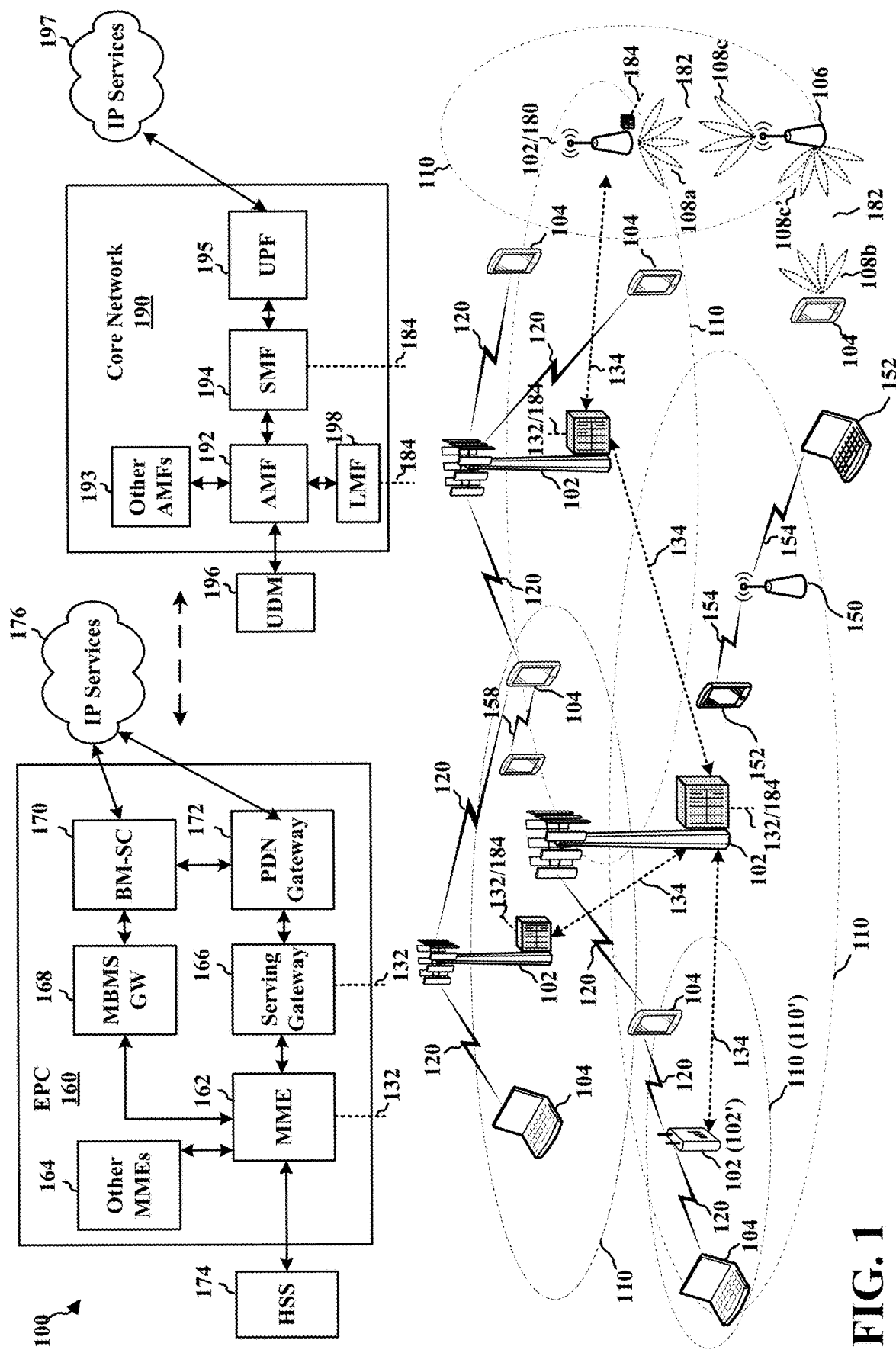
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to 7 MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108a. The UE 104 may receive the beamformed signal from the base station 180 in one or more receive directions 108b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Figure 2:
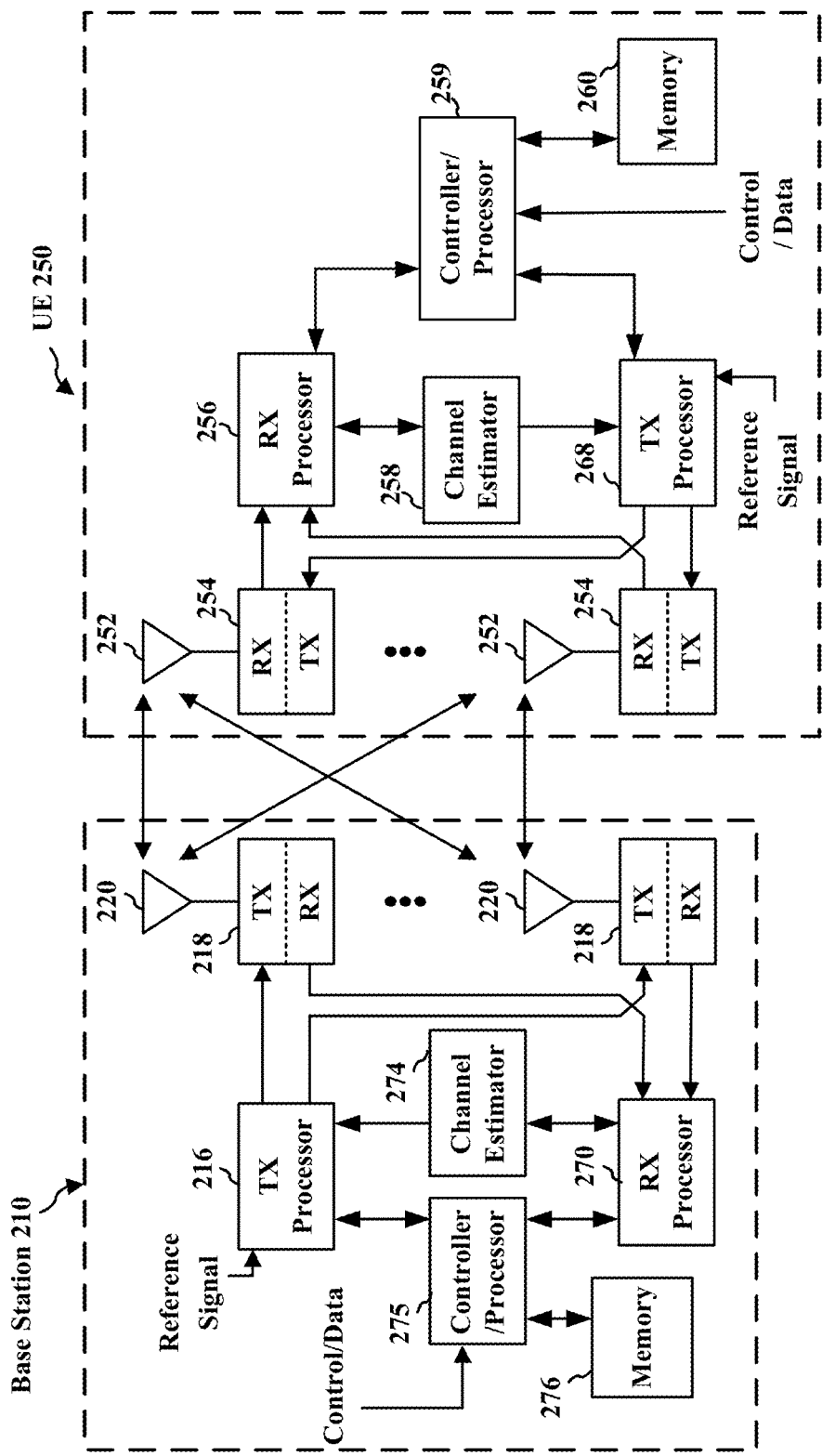
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/ processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHz may be supported. In one example, NR resource blocks (RBs) may span 12 sub-carriers with a sub-carrier bandwidth of 60 kHz over a 0.25 ms duration or a bandwidth of 30 kHz over a 0.5 ms duration (similarly, 50 MHz BW for 15 kHz SCS over a 1 ms duration). Each radio frame may consist of 10 subframes (10, 20, 40 or 80 NR slots) with a length of 10 ms. Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
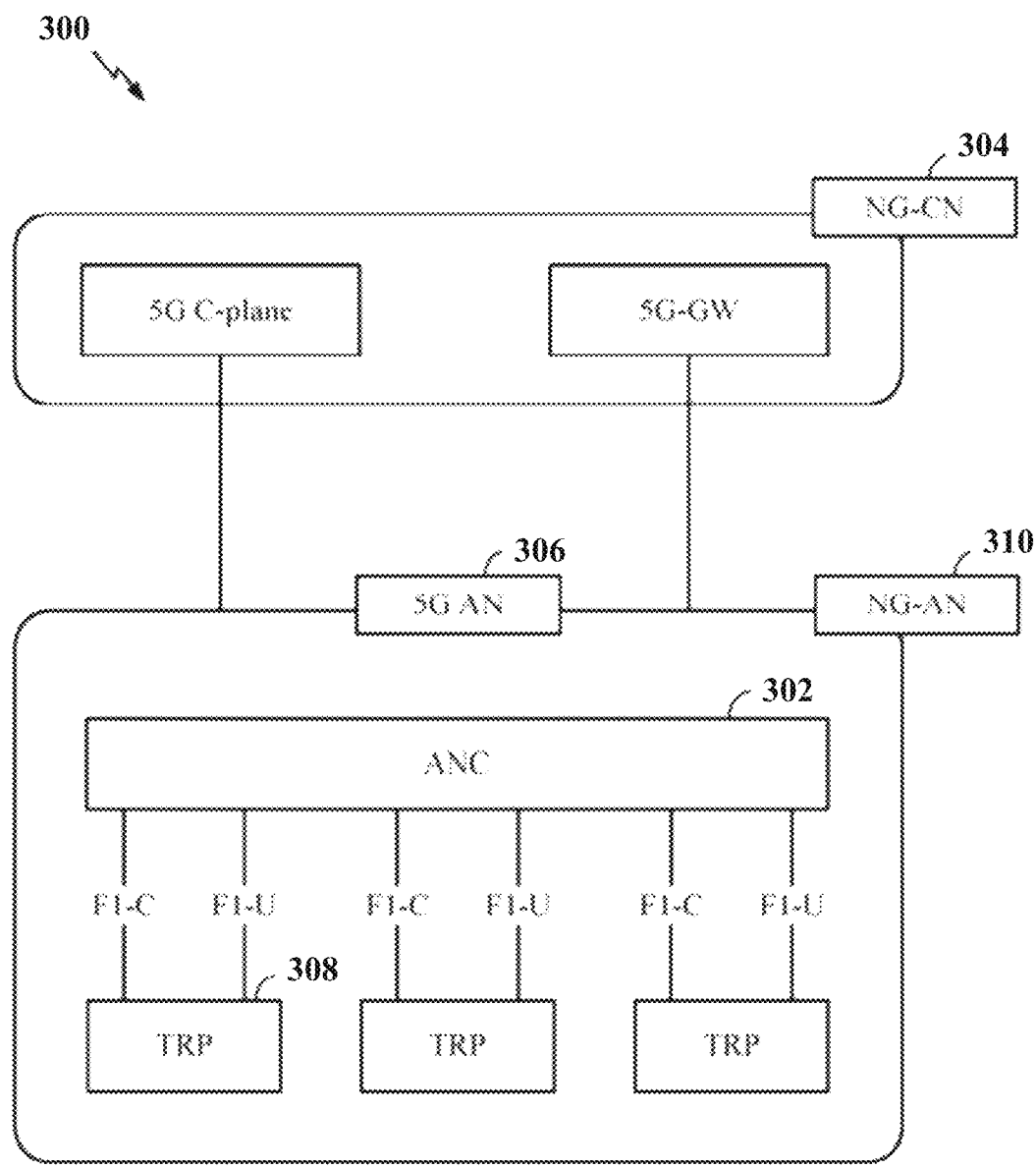
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
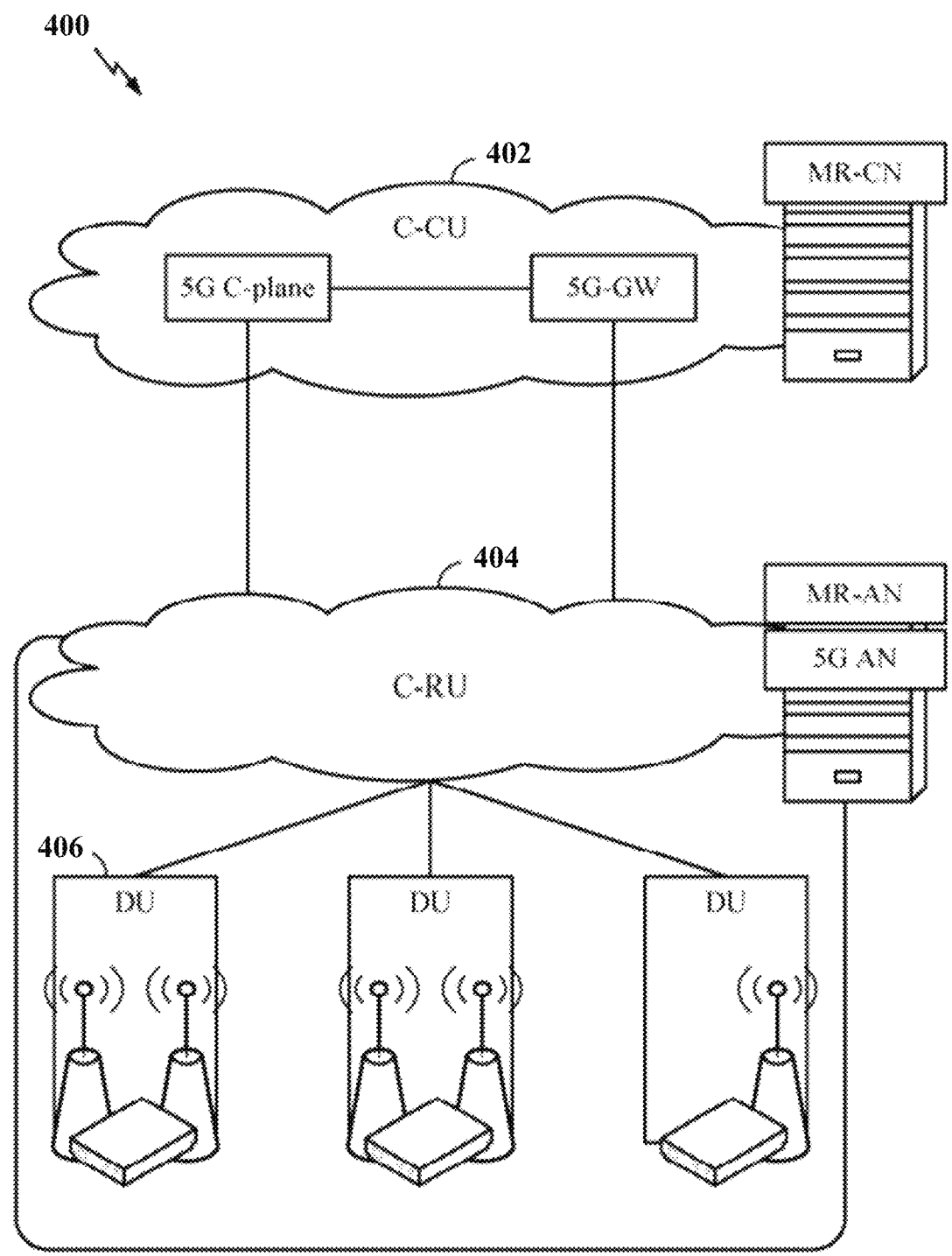
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
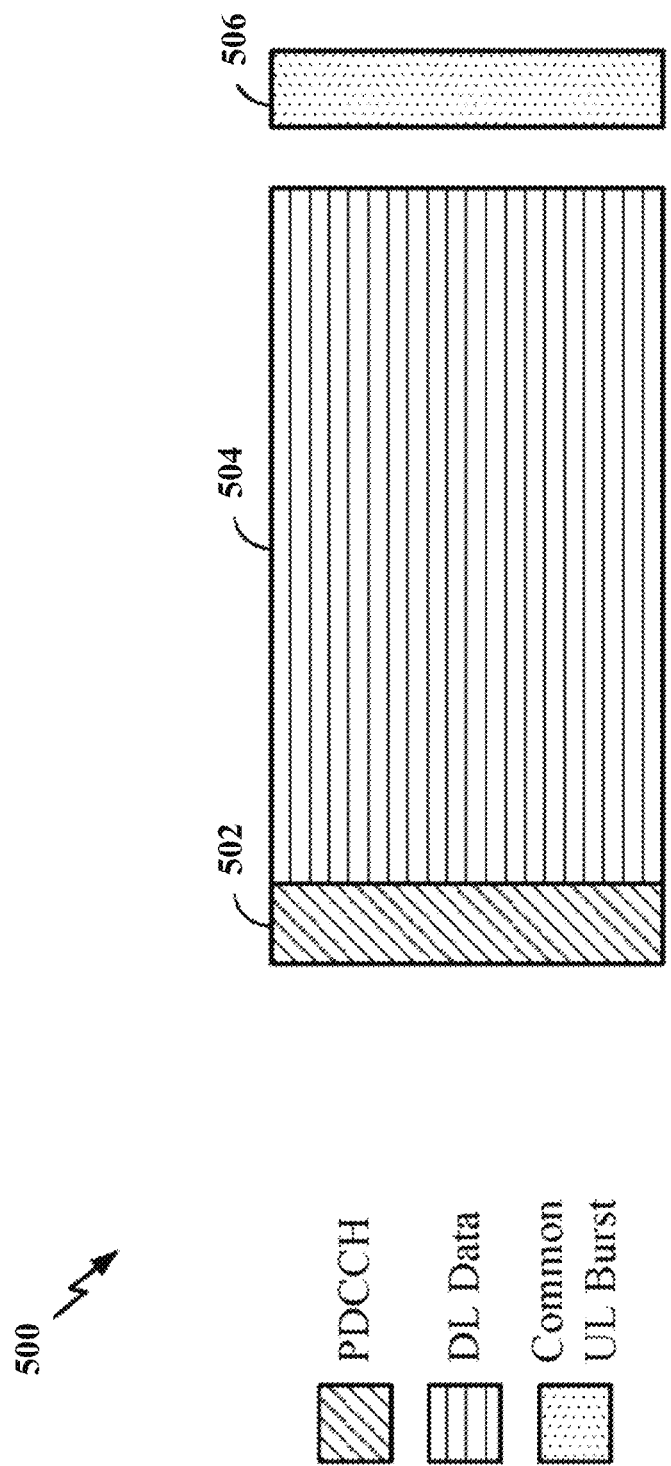
FIG. 5 is a diagram showing an example of a DL-centric slot.

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

Figure 6:
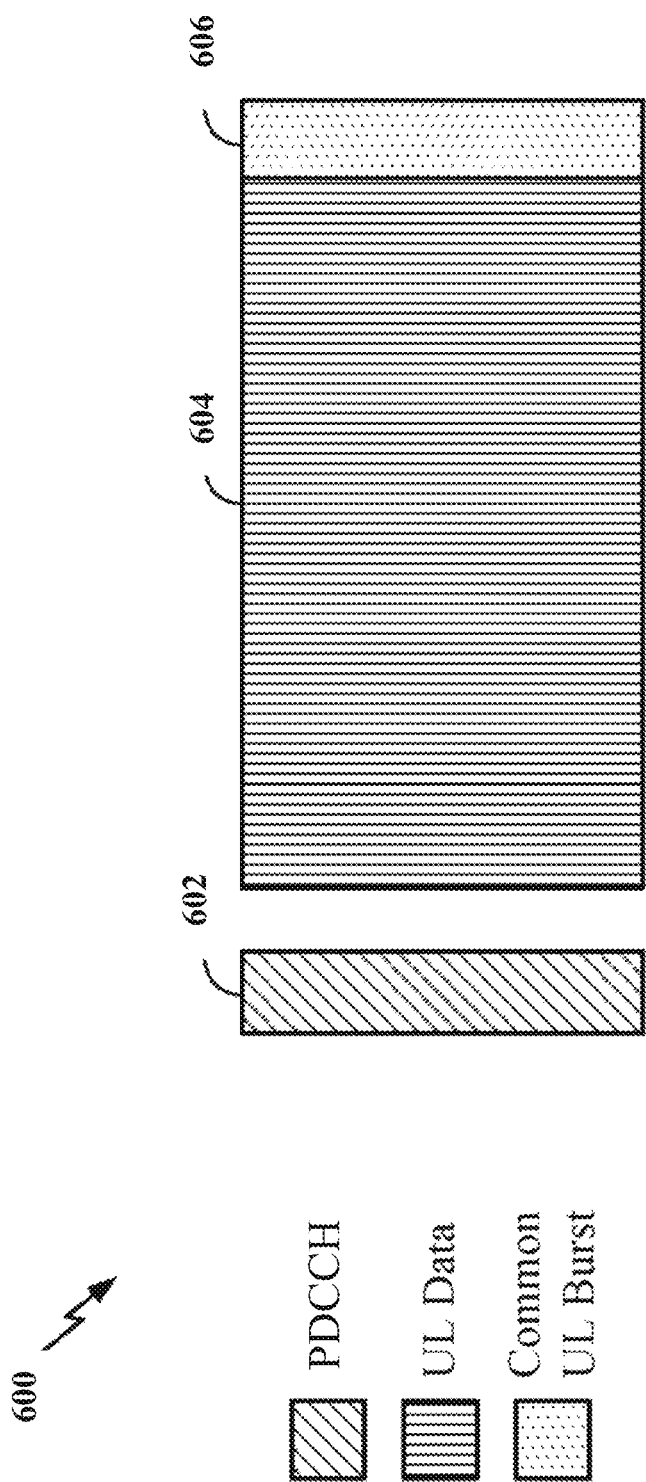
FIG. 6 is a diagram showing an example of an UL-centric slot.

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 7:
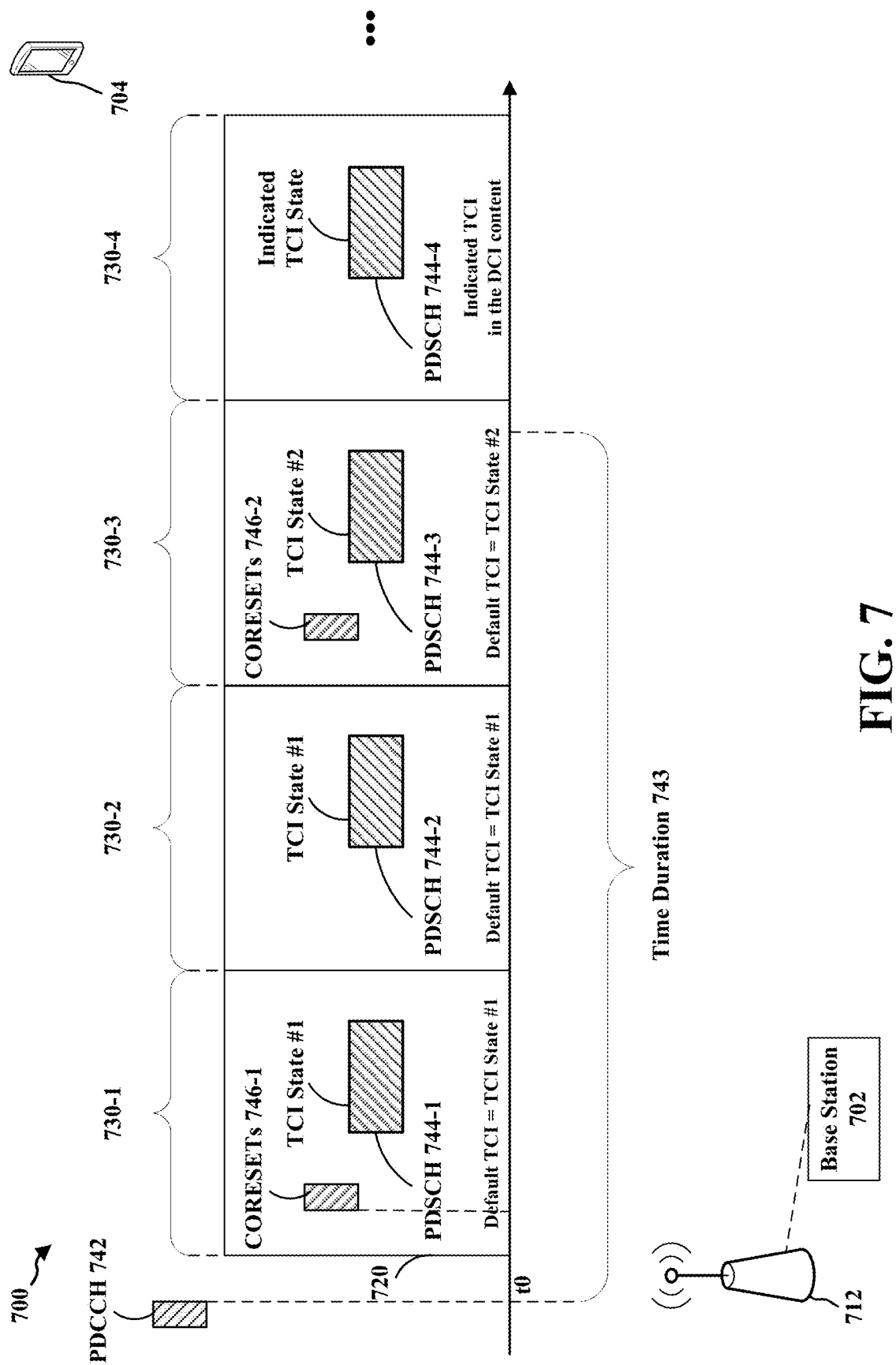
FIG. 7 is a diagram illustrating a scheme of one DCI scheduling multiple PDSCHs from one transmission/reception point (TRP).

FIG. 7 is a diagram 700 illustrating a scheme of one DCI scheduling multiple PDSCHs from one transmission/reception point (TRP). A base station 702 may establish a carrier 720 through TRP 712 with a UE 704 and communicate according to slots 730-1, 730-2, 730-3, 730-4, etc. The base station 702 informs the UE 704 about beams selected for data transmission, using a field known as the transmission configuration indication (TCI) state. The UE 704 can then look up the corresponding beam for reception.

In this example, the base station 702 transmits a PDCCH 742 to the UE 704 in a slot prior to or in the slot 730-1. The PDCCH 742 may indicate transmission of PDSCHs in one or more slots. More specifically, in this example, the PDCCH 742 indicates transmissions of PDSCHs 744-1 in the slot 730-1, PDSCHs 744-2 in the slot 730-2, PDSCHs 744-3 in the slot 730-3, and PDSCHs 744-4 in the slot 730-4, respectively. The UE 704 determines a parameter timeDurationForQCL, which corresponds to a time duration 743, from a time point t0 at which the PDCCH 742 is completely received, that is allocated to the UE 704 to obtain DCI carried in the PDCCH 742 and determine the scheduling information of the PDSCHs 744-1, 744-2, 744-3, 744-4. The UE 704 reports the timeDurationForQCL to the base station 702, and the base station 702 schedules data transmissions to the UE 704 according to this capability. The gaps between the time point t0 and the PDSCHs 744-1, 744-2, 744-3 are smaller than the time duration 743 and the gap between time point t0 and the PDSCH 744-4 is larger than the time duration 743.

Prior to the end of the time duration 743, the UE 704 may not have decoded the DCI carried in the PDCCH 742. Accordingly, the UE 704 does not perform reception of signals in the time duration 743 according to the TCI states indicated in the DCI. Rather, the UE 704 receives signals in the time duration 743 according to one or more TCI states determined based on the techniques described infra, and buffers the received signals until the end of the time duration 743. Subsequently, the UE 704 locates the PDSCHs (if any) in the received signals according to the DCI that was carried in the PDCCH 742 and that has now been decoded. In one technique, in the time duration 743, the UE 704 receives signals according to a default TCI state corresponding to the lowest controlResourceSetId in the latest slot in which one or more CORESETs are monitored by the UE. In this example, the time duration 743 overlaps with the slots 730-1, 730-2 and 730-3. The initial CORESETs configured in the time duration 743 are one or more CORESETs 746-1, each of which is assigned a respective controlResourceSetId. The UE 704 is configured with a respective default TCI state for receiving signals carried in each of the CORESETs 746-1. The UE 704, accordingly, receives signals carried in the CORESETs 746-1. The UE 704 determines a particular CORESET of the CORESETs 746-1 that has the lowest controlResourceSetId. The UE 704 determines a TCI state (e.g., a default TCI state) configured for receiving signals carried in the particular CORESET. In this example, the TCI state is TCI state #1. In this technique, after the CORESETs 746-1, the UE 704 receives signals in the time duration 743 according to the TCI state #1 until another CORESET in the time duration 743 or until the end of the time duration 743 when there is no other CORESET.

In this example, after the CORESETs 746-1, within the time duration 743, one or more CORESETs 746-2 are further configured for the UE 704. Similarly, the UE 704 receives signals in the CORESETs 746-2 according to corresponding TCI states. The UE 704 determines a particular CORESET of the CORESETs 746-2 that has the lowest controlResourceSetId. The UE 704 determines a TCI state (e.g., a default TCI state) configured for receiving signals carried in the particular CORESET. In this example, the TCI state is TCI state #2. In this technique, after the CORESETs 746-2, the UE 704 receives signals in the time duration 743 according to the TCI state #2 until another CORESET in the time duration 743 or until the end of the time duration 743 when there is no other CORESET.

If the gap between the scheduling PDCCH and a scheduled PDSCH reception is equal or greater than a threshold specified by timeDurationForQCL, the UE receives the scheduled PDSCH, based on the TCI state indicated in the DCI content if the indicated TCI state exists in DCI content, or based on the TCI state used to receive the scheduling PDCCH, for the reception of the PDSCH if the indicated TCI state does not exist in the DCI content. In this example, UE 704 receives PDSCH 744-4 and subsequent PDSCHs in beams according to the TCI state indicated in the DCI content of the PDCCH 742 for the reception of PDSCH 744-4 and the subsequent PDSCHs.

Figure 8:
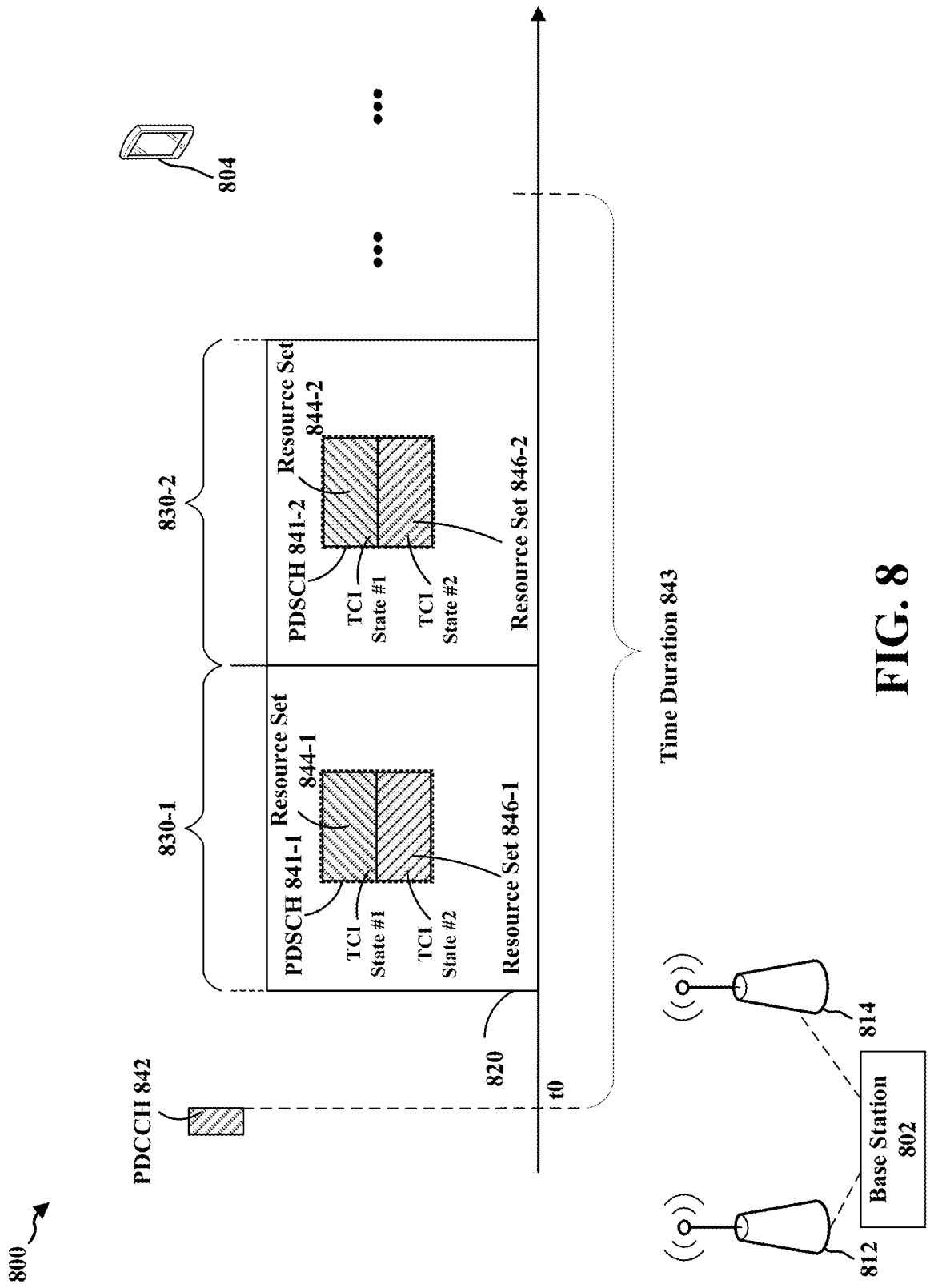
FIG. 8 is a diagram illustrating a scheme of a DCI message scheduling multiple PDSCHs from multiple TRPs.

FIG. 8 is a diagram 800 illustrating a scheme of a DCI message scheduling multiple PDSCHs from multiple TRPs. A base station 802 may establish carriers through TRP 812 and TRP 814 with a UE 804 and communicate according to slots 830-1, 830-2, etc. The base station 802 transmits a PDCCH 842 to the UE 804 in a slot prior to or in the slot 830-1. The PDCCH 842 may indicate transmission of multiple PDSCHs in one or more slots. The UE 804 determines a parameter timeDurationForQCL, which corresponds to a time duration 843, from a time point t0 at which the PDCCH 842 is completely received, that is allocated to the UE 804 to obtain DCI carried in the PDCCH 842 and determine the scheduling information of the PDSCHs 841-1, 841-2. The UE 804 reports the timeDurationForQCL to the base station 802, and the base station 802 schedules data transmissions to the UE 804 according to this capability.

Prior to the end of the time duration 843, the UE 804 may not have decoded the DCI carried in the PDCCH 842. Accordingly, the UE 804 does not perform reception of signals in the time duration 843 according to the TCI states indicated in the DCI. Rather, the UE 804 receives signals in the time duration 843 according to one or more TCI states determined based on the techniques described infra, and buffers the received signals until the end of the time duration 843. Subsequently, the UE 804 locates the PDSCHs (if any) in the received signals according to the DCI that was carried in the PDCCH 842 and that has now been decoded.

The UE 804 is activated with multiple sets of TCI states, which are indicated by multiple sets of TCI state indications. In this example, each set of the multiple sets may include one or two TCI state indications. Further, the multiple sets are indexed with multiple codepoints; each codepoint is uniquely associated with one set of TCI state indications. The PDCCH 842 may contain a respective codepoint for each PDSCH scheduled by the PDCCH 842. After obtaining the respective codepoint, The UE 804 locates the corresponding set of TCI state indications of the respective codepoint. Accordingly, the UE 804 receives the PDSCH using the set of TCI states indicated by the corresponding set of TCI state indications.

In one technique, in the time duration 843, the UE 804 determines that a default codepoint is the lowest codepoint of the codepoints corresponding to the multiple sets of the TCI state indications in the slot with the first PDSCH transmission occasion for the reception of PDSCH. In certain configurations, the default codepoint is the lowest codepoint correspond to a set of TCI state indications containing at least two TCI state indications. The UE 804 then locates the default set of TCI state indications corresponding to the default codepoint, and determines the default set of TCI states indicated by the default set of TCI state indications. Accordingly, the UE 804 receives signals in all or part of the resources in the time duration 843 using the default set of TCI states. The UE 804 may use the default set of TCI states for all slots in the time duration 843.

In this example, the time duration 843 overlaps with the slots 830-1, 830-2, etc. The default TCI states determined according to the techniques described supra are TCI state #1 and TCI state #2. The UE 804 receives the signals transmitted in the time duration 843 according to both the TCI state #1 and the TCI state #2.

In this example, under a first configuration, the base station 802 configures the UE 804 to receive data in accordance with a scheme "fdmSchemeA." More specifically, in this configuration, the PDCCH 842 indicates transmission, from the TRP 812, of a portion of a PDSCH 841-1 in a resource set 844-1 and indicates transmission, from the TRP 814, of another portion of the PDSCH 841-1 in a resource set 846-1 in the slot 830-1. The PDCCH 842 further indicates transmission, from the TRP 812, of a portion of a PDSCH 841-2 in a resource set 844-2 and indicates transmission, from the TRP 814, another portion of the PDSCH 841-2 in a resource set 846-2 in the slot 830-2, and so on.

As described supra, the UE 804 determines the parameter timeDurationForQCL, which indicates the time duration 843 that is allocated to the UE 804 to obtain DCI carried in the PDCCH 842 and determine the scheduling information of the PDSCH 841-1 and the PDSCH 841-2. The gaps between the time point t0 and resource sets 844-1, 844-2, 846-1 and 846-2 are smaller than the time duration 843. After the end of the time duration 843, the UE 804 has obtained the information for receiving the PDSCH 841-1 and the PDSCH 841-2. In this example, the UE 804 may have received and buffered signals carried in the resource sets 844-1, 844-2, 846-1 and 846-2 according to both the TCI state #1 and the TCI state #2. The UE 804 select the best buffered signals, and demodulate and decode the best buffered signals to obtain data of the PDSCH 841-1 and the PDSCH 841-2.

Under a second configuration, the base station 802 configures the UE 804 to receive data in accordance with a scheme "fdmSchemeB." More specifically, in this configuration, the PDCCH 842 indicates transmission, from the TRP 812, of all the data of the PDSCH 841-1 in a resource set 844-1 and indicates transmission, from the TRP 814, of all the data of the PDSCH 841-1 in a resource set 846-1 in the slot 830-1. The PDCCH 842 further indicates transmission, from the TRP 812, of all the data of the PDSCH 841-2 in a resource set 844-2 and indicates transmission, from the TRP 814, all data of the PDSCH 841-2 in a resource set 846-2 in the slot 830-2, and so on.

As described supra, the gaps between the time point t0 and resource sets 844-1, 844-2, 846-1 and 846-2 are smaller than the time duration 843. After the end of the time duration 843, the UE 804 has obtained the information for receiving the PDSCH 841-1 and the PDSCH 841-2. In this example, the UE 804 may have received and buffered signals carried in the resource sets 844-1, 844-2, 846-1 and 846-2 according to both the TCI state #1 and the TCI state #2. The UE 804 may select the best buffered signals, and demodulate and decode the best buffered signals to obtain data of the PDSCH 841-1 and the PDSCH 841-2. Alternatively, the UE 804 may preform combined demodulation/decoding based on the signals received in both resource sets in a slot, as the UE 804 has received two copies of the same data in the two resource sets.

Under a third configuration, the base station 802 configures the UE 804 to receive data in accordance with a scheme "SDM." More specifically, in this configuration, the PDCCH 842 indicates transmission, from the TRP 812, of all data of the PDSCH 841-1 in the resource set 844-1 and the resource set 846-1. The resource set 844-1 and the resource set 846-1 collectively form a resource set. The PDCCH 842 indicates transmission, from the TRP 814, of all the data of the PDSCH 841-1 also in the resource set 844-1 and the resource set 846-1. The PDCCH 842 further indicates transmission, from the TRP 812, of all the data of the PDSCH 841-2 in in the resource set 844-2 and the resource set 846-2, and indicates transmission, from the TRP 814, all the data of the PDSCH 841-2 in the resource set 844-2 and the resource set 846-2, and so on. The resource set 844-2 and the resource set 846-2 collectively form a resource set.

As described supra, the gaps between the time point t0 and resource sets 844-1, 844-2, 846-1 and 846-2 are smaller than the time duration 843. After the end of the time duration 843, the UE 804 has obtained the information for receiving the PDSCH 841-1 and the PDSCH 841-2. In this example, the UE 804 may have received and buffered signals carried in the resource sets 844-1, 844-2, 846-1 and 846-2 according to both the TCI state #1 and the TCI state #2. The UE 804 may select the best buffered signals, and demodulate and decode the best buffered signals to obtain data of the PDSCH 841-1 and the PDSCH 841-2. Alternatively, the UE 804 may preform combined demodulation/decoding based on the signals received in both resource sets in a slot, as the UE 804 has received two copies of the same data in the two resource sets.

Figure 9:
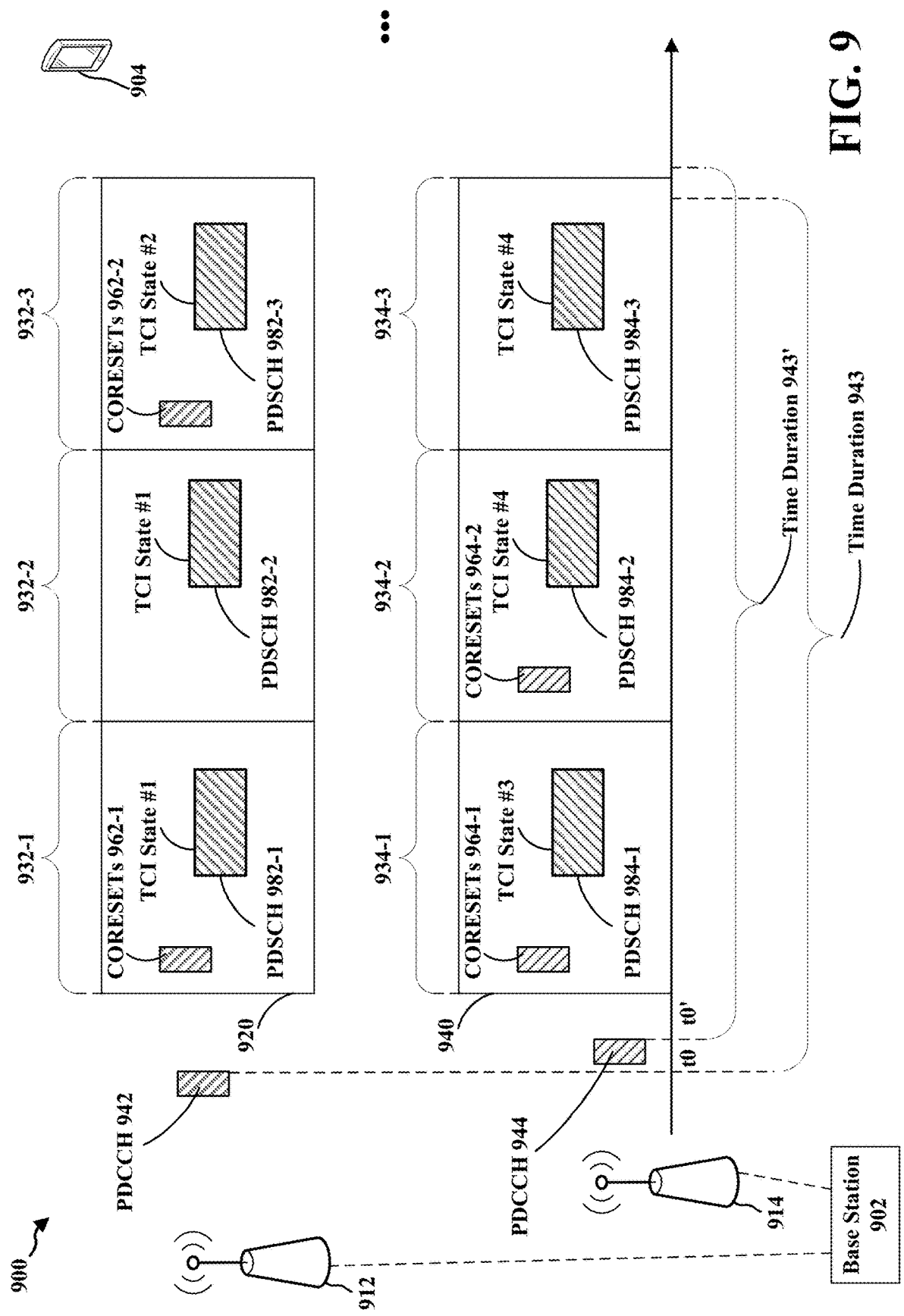
FIG. 9 is a diagram illustrating a scheme of multiple DCI messages scheduling multiple PDSCHs from multiple TRPs.

FIG. 9 is a diagram 900 illustrating a scheme of multiple DCI messages scheduling multiple PDSCHs from multiple TRPs. A base station 902 may establish a carrier 920 through TRP 912 with a UE 904 and communicate according to slots 932-1, 932-2, 932-3, etc. and a carrier 940 through TRP 914 with the UE 904 and communicate according to slots 934-1, 934-2, 934-3, etc. The slots 932-1, 932-2, 932-3 and the slots 934-1, 934-2, 934-3 may be aligned.

In this example, the base station 902 transmits a PDCCH 942 through TRP 912 and a PDCCH 944 through TRP 914 to the UE 904 in a slot prior to or in the slot 932-1 or the slot 934-1. The PDCCH 942 and the PDCCH 944 may indicate transmission of PDSCHs in one or more slots. More specifically, the PDCCH 942 indicates transmissions of a PDSCH 982-1 in the slot 932-1, a PDSCH 982-2 in the slot 932-2, and a PDSCH 982-3 in the slot 932-3. The PDCCH 944 indicates transmissions of a PDSCH 984-1 in the slot 934-1, a PDSCH 984-2 in the slot 934-2, and a PDSCH 984-3 in the slot 934-3. The UE 904 completes the reception of the PDCCH 942 at a time point t0. The UE 904 completes the reception of the PDCCH 944 at a time point t0'. The UE 904 determines a parameter timeDurationForQCL, which corresponds to a time duration 943, from the time point t0, that is allocated to the UE 904 to obtain DCIs carried in the PDCCH 942 and determine the scheduling information of the PDSCHs 982-1, 982-2, 982-3. The parameter timeDurationForQCL also corresponds to a time duration 943', from the time point t0', that is allocated to the UE 904 to obtain DCIs carried in the PDCCH 942 and determine the scheduling information of the PDSCHs 984-1, 984-2, 984-3. The gaps between the time point t0 and the PDSCHs 982-1, 982-2, 982-3 are smaller than the time duration 943. The gaps between the time point t0' and the PDSCHs 984-1, 984-2, 984-3 are smaller than the time duration 943'.

Prior to the end of the time duration 943 and the end of the time duration 943', the UE 904 may not have decoded the DCIs carried in the PDCCH 942 and in the PDCCH 944, respectively. Accordingly, the UE 904 does not perform reception of signals in the time duration 943 or the time duration 943' according to the TCI states indicated in the DCI. Rather, the UE 904 receives signals in the time duration 943 or the time duration 943' according to one or more TCI states determined based on the techniques described infra, and buffers the received signals until the end of the time duration 943 or the end of the time duration 943'. Subsequently, the UE 904 locates the PDSCHs (if any) in the received signals according to the DCI that was carried in the PDCCH 942 and in the PDCCH 944, and that has now been decoded.

The PDCCH 942 may contain a parameter coresetPoolIndex indicating a particular CORESET pool. In this example, the time duration 943 overlaps with the slots 932-1, 932-2, 932-3. The initial CORESETs configured in the time duration 943 are one or more CORESETs 962-1 with the same coresetPoolIndex of the PDCCH 942.

The PDCCH 944 may contain the parameter coresetPoolIndex indicating a particular CORESET pool. In this example, the time duration 943' overlaps with the slots 932-1, 932-2, 932-3. The initial CORESETs configured in the time duration 943' are one or more CORESETs 964-1 with the same coresetPoolIndex of the PDCCH 944.

Each CORESET is assigned a respective controlResourceSetId. The UE 904 is configured with a respective TCI state for receiving signals carried in each of the CORESETs 962-1 and 964-1. The UE 904, accordingly, receives signals carried in the CORESETs 962-1 and 964-1 according to those TCI states.

For communication with the TRP 912, the UE 904 determines a first particular CORESET of the CORESETs 962-1 that has the lowest controlResourceSetId among those CORESETs. The UE 904 determines a TCI state (e.g., a default TCI state) configured for receiving signals carried in the first particular CORESET. In this example, the TCI states is TCI state #1.

For communication with the TRP 914, the UE 904 determines a particular CORESET of the CORESETs 964-1 that has the lowest controlResourceSetId among those CORESETs. The UE 904 determines a TCI state (e.g., a default TCI state) configured for receiving signals carried in the particular CORESET. In this example, the TCI states is TCI state #3.

In this technique, after the CORESETs 962-1, the UE 904 receives signals from the TRP 912 in the time duration 943 according to the TCI state #1 until another CORESET configured for receiving signals from the TRP 912 in the time duration 943 or until the end of the time duration 943 when there is no other CORESET.

After the CORESETs 964-1, the UE 904 receives signals from the TRP 914 in the time duration 943' according to the TCI state #3 until another CORESET configured for receiving signals from the TRP 914 in the time duration 943' or until the end of the time duration 943' when there is no other CORESET.

In this example, after the CORESETs 962-1, within the time duration 943, one or more CORESETs 962-2 with the same coresetPoolIndex as that of the PDCCH 942 are further configured for the UE 904 to receive signals from the TRP 912. Similarly, the UE 904 receives signals in the CORESETs 962-2 according to corresponding TCI states. The UE 904 determines a particular CORESET of the CORESETs 962-2 that has the lowest controlResourceSetId. The UE 904 determines a TCI state (e.g., a default TCI state) configured for receiving signals carried in the particular CORESET. In this example, the TCI state is TCI state #2. In this technique, after the CORESETs 962-2, the UE 904 receives signals from the TRP 912 in the time duration 943 according to the TCI state #2 until another CORESET with the same coresetPoolIndex as that of the PDCCH 942 in the time duration 943 or until the end of the time duration 943 when there is no other CORESET.

In this example, after the CORESETs 964-1, within the time duration 943', one or more CORESETs 964-2 with the same coresetPoolIndex as that of the PDCCH 944 are further configured for the UE 904 to receive signals from the TRP 914. Similarly, the UE 904 receives signals in the CORESETs 964-2 according to corresponding TCI states. The UE 904 determines a particular CORESET of the CORESETs 964-2 that has the lowest controlResourceSetId. The UE 904 determines a TCI state (e.g., a default TCI state) configured for receiving signals carried in the particular CORESET. In this example, the TCI state is TCI state #4. In this technique, after the CORESETs 964-2, the UE 904 receives signals from the TRP 914 in the time duration 943 according to the TCI state #4 until another CORESET with that same coresetPoolIndex as that of PDCCH 944 in the time duration 943' or until the end of the time duration 943' when there is no other CORESET.

Figure 10:
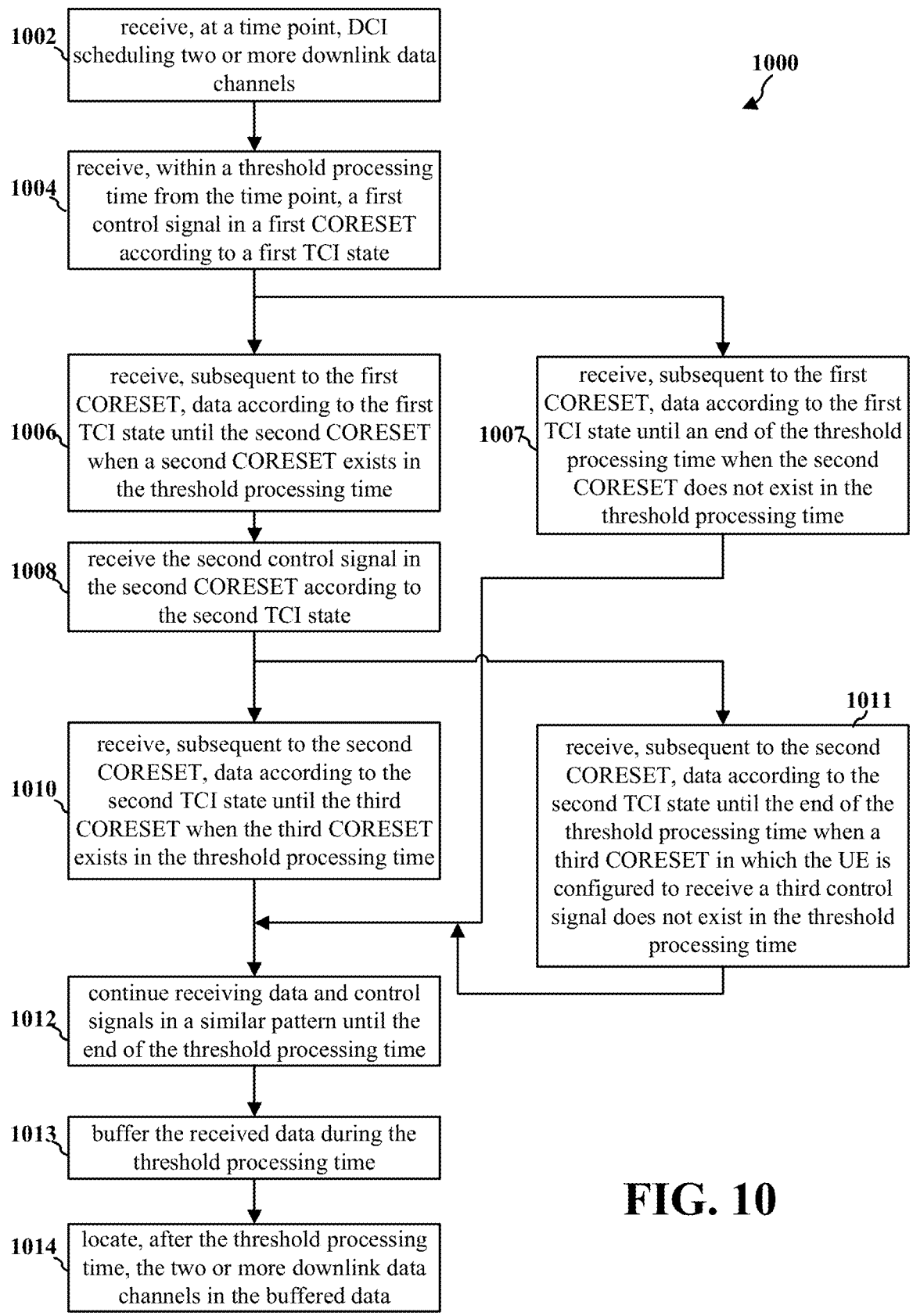
FIG. 10 is a flow chart of a method (process) for receiving multiple downlink data channels transmitted from a single TRP and scheduled by a single DCI message.

FIG. 10 is a flow chart 1000 of a method (process) for receiving multiple downlink data channels transmitted from a single TRP and scheduled by a single DCI message. The method may be performed by a UE and a wireless device (e.g., the UE 704). At operation 1002, the UE receives, at a time point, DCI scheduling two or more downlink data channels. At operation 1004, the UE receive, within a threshold processing time from the time point, a first control signal in a first CORESET according to a first TCI state. The threshold processing time is allocated for the UE to decode the downlink control information.

When a second CORESET in which the UE is configured to receive a second control signal exists in the threshold processing time, at operation 1006, the UE receives, subsequent to the first CORESET, data according to the first TCI state until the second CORESET. The UE then enters operation 1008.

When the second CORESET does not exist in the threshold processing time, at operation 1007, the UE receives, subsequent to the first CORESET, data according to the first TCI state until an end of the threshold processing time. The UE then enters operation 1012.

At operation 1008, when the second control signal is configured to be received according to a second TCI state, the UE receives the second control signal in the second CORESET according to the second TCI state.

When a third CORESET in which the UE is configured to receive a third control signal exists in the threshold processing time, at operation 1010, the UE receives, subsequent to the second CORESET, data according to the second TCI state until the third CORESET. The UE then enters operation 1012.

When the third CORESET does not exist in the threshold processing time, at operation 1011, the UE receives, subsequent to the second CORESET, until the end of the threshold processing time. The UE then enters operation 1012.

At operation 1012, the UE continues receiving data and control signals in a similar pattern until the end of the threshold processing time. At operation 1013, the UE buffers the received data during the threshold processing time. At operation 1014, the UE locates, after the threshold processing time, the two or more downlink data channels in the buffered data.

Figure 11:
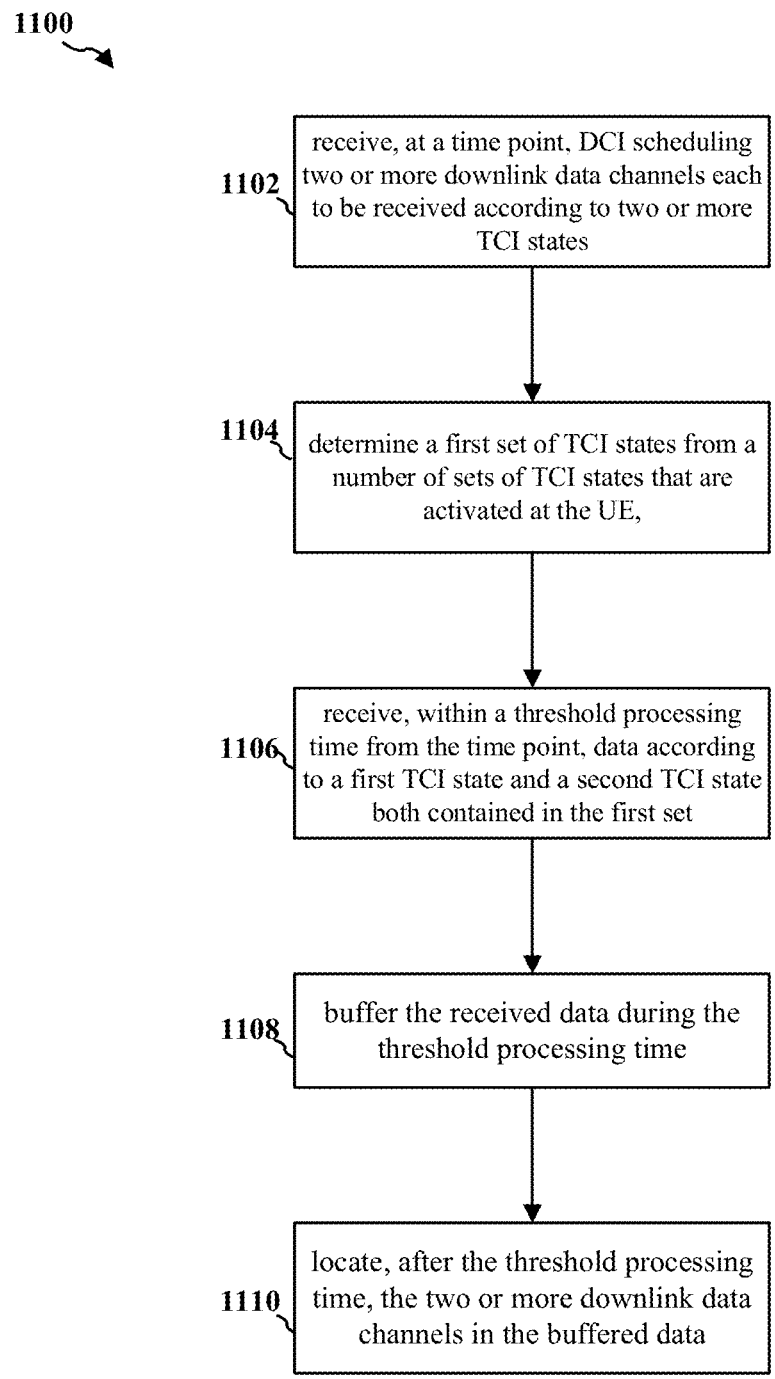
FIG. 11 is a flow chart of a method (process) for receiving multiple downlink data channels transmitted from multiple TRPs and scheduled by a single DCI message.

FIG. 11 is a flow chart 1100 of a method (process) for receiving multiple downlink data channels transmitted from multiple TRPs and scheduled by a single DCI message. The method may be performed by a UE and a wireless device (e.g., the UE 804). At operation 1102, the UE receives, at a time point, DCI scheduling two or more downlink data channels each to be received according to two or more TCI states. At operation 1104, the UE determines a first set of TCI states from a number of sets of TCI states that are activated at the UE. Each set of the number of sets corresponds to a respective codepoint and the first set has a codepoint that is the lowest among sets of TCI states each containing two or more TCI states.

At operation 1106, the UE receives, within a threshold processing time from the time point, data according to a first TCI state and a second TCI state both contained in the first set. The threshold processing time is allocated for the UE to decode the downlink control information. At operation 1108, the UE buffers the received data during the threshold processing time. At operation 1110, the UE locates, after the threshold processing time, the two or more downlink data channels in the buffered data.

Figure 12A:
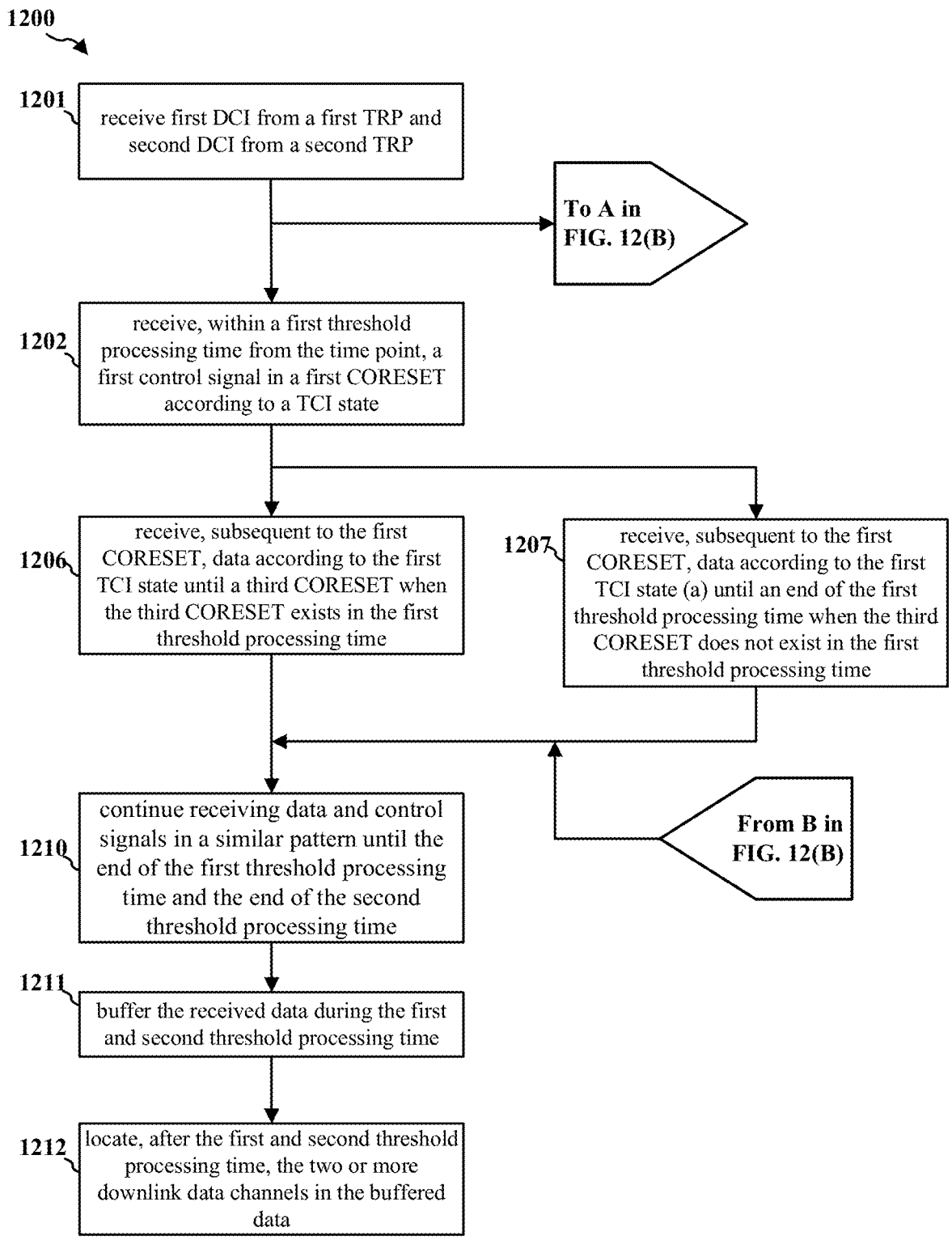
FIGS. 12(A) and 12(B) are a flow chart of a method (process) for receiving multiple downlink data channels transmitted from multiple TRPs and scheduled by multiple DCI messages.
Figure 12B:
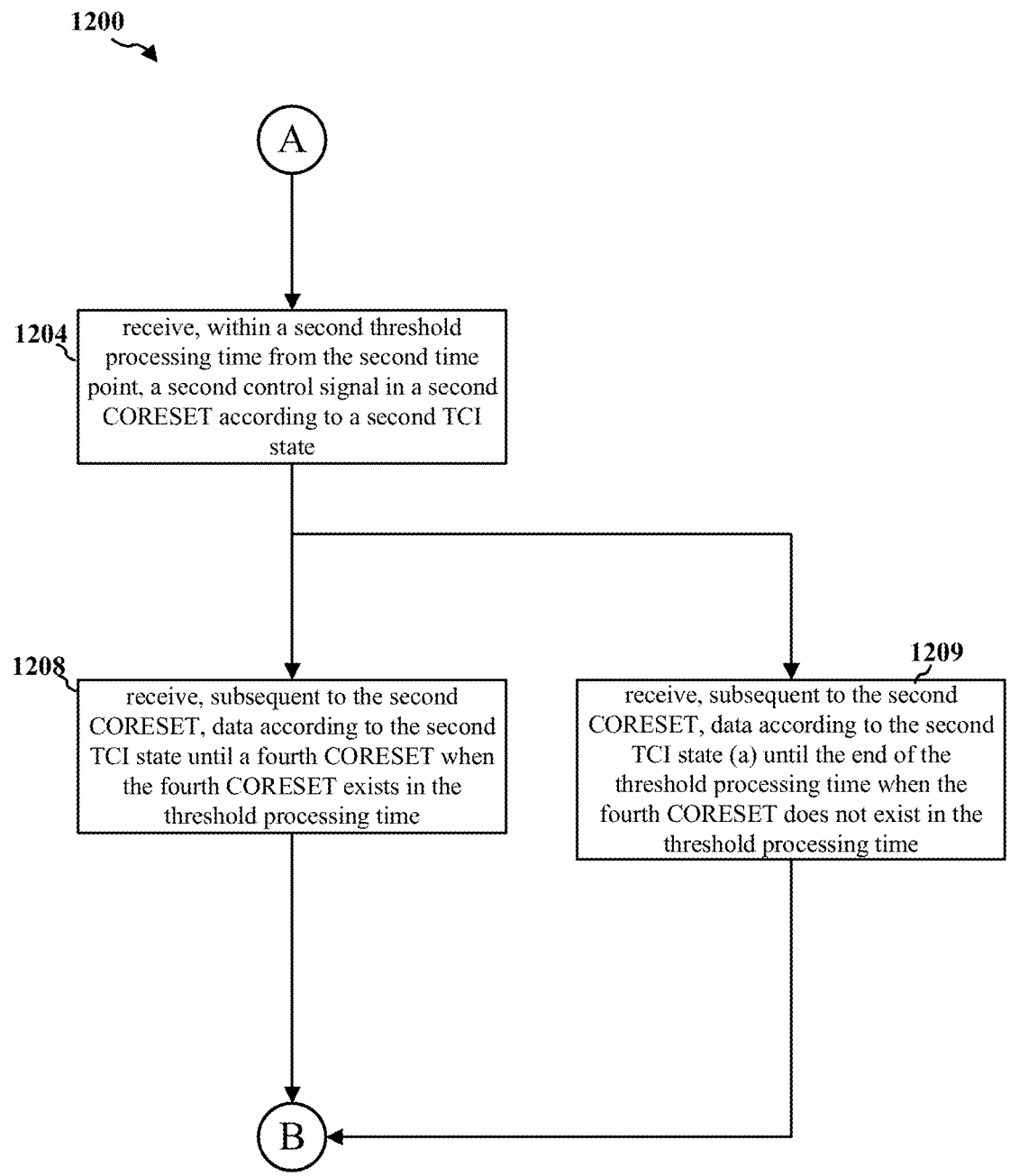

FIGS. 12(A) and 12(B) are a flow chart 1200 of a method (process) for receiving multiple downlink data channels transmitted from multiple TRPs and scheduled by multiple DCI messages. The method may be performed by a UE and a wireless device (e.g., the UE 904). At operation 1201, the UE receives, at a first time point, first DCI from a first TRP and receives, at a second time point, second DCI from a second TRP.

In one subprocess, the UE communicates with the first TRP. At operation 1202, the UE receives, within a first threshold processing time from the first time point, a first control signal in a first CORESET, provided from the first TRP, according to a first TCI state. The first threshold processing time is allocated for the UE to decode the first DCI.

At operation 1206, when a third CORESET in which the UE is configured to receive a third control signal exists in the first threshold processing time, the UE receives, subsequent to the first CORESET, data according to the first TCI state until the third CORESET. Further, the third control signal is configured to be received according to a third TCI state. The UE receives the third control signal in the third CORESET according to the third TCI state. The UE may receive, subsequent to the third CORESET, data according to the third TCI state (a) until the end of the first threshold processing time when a fifth CORESET in which the UE is configured to receive a fifth control signal does not exist in the first threshold processing time or (b) until the fifth CORESET when the fifth CORESET exists in the first threshold processing time.

At operation 1207, when the third CORESET does not exist in the first threshold processing time, the UE receives, subsequent to the first CORESET, data according to the first TCI state until an end of the first threshold processing time. The UE then enters operation 1210.

In another subprocess, the UE communicates with the second TRP. At operation 1204, the UE receives, within a second threshold processing time from the second time point, a second control signal in a second CORESET, provided from the second TRP, according to a second TCI state. At operation 1208, when a fourth CORESET in which the UE is configured to receive a fourth control signal exists in the second threshold processing time, the UE receives, subsequent to the second CORESET, data according to the second TCI state until the fourth CORESET. Further, the fourth control signal is configured to be received according to a fourth TCI state. The UE receives the fourth control signal in the fourth CORESET according to the fourth TCI state. The UE then enters operation 1210.

At operation 1209, when the fourth CORESET does not exist in the second threshold processing time, the UE receives, subsequent to the second CORESET, data according to the second TCI state until the end of the second threshold processing time. The UE then enters operation 1210.

At operation 1210, the UE continues receiving data and control signals in a similar pattern until the end of the first threshold processing time and the end of the second threshold processing time. At operation 1211, the UE buffers the received data during the first and second threshold processing time. At operation 1212, the UE locates, after the first and the second threshold processing time, the two or more downlink data channels in the buffered data.

Figure 13:
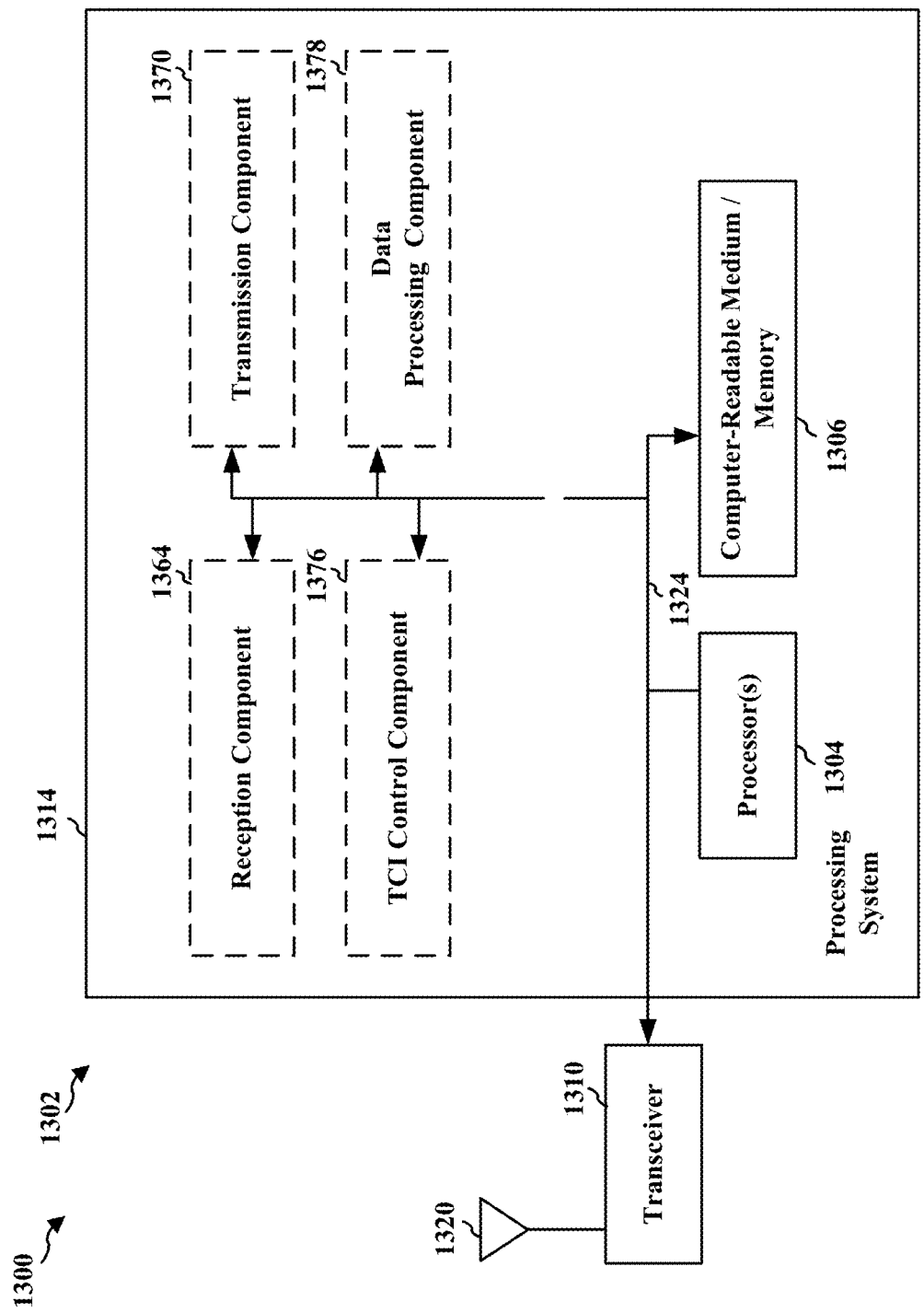
FIG. 13 is a diagram illustrating an example of a hardware implementation for an apparatus employing a processing system.

FIG. 13 is a diagram 1300 illustrating an example of a hardware implementation for an apparatus 1302 employing a processing system 1314. The apparatus 1302 may be a UE (e.g., the UE 804). The processing system 1314 may be implemented with a bus architecture, represented generally by a bus 1324. The bus 1324 may include any number of interconnecting buses and bridges depending on the specific application of the processing system 1314 and the overall design constraints. The bus 1324 links together various circuits including one or more processors and/or hardware components, represented by one or more processors 1304, a reception component 1364, a transmission component 1370, a TCI control component 1376, a data processing component 1378, and a computer-readable medium/memory 1306. The bus 1324 may also link various other circuits such as timing sources, peripherals, voltage regulators, and power management circuits, etc.

The processing system 1314 may be coupled to a transceiver 1310, which may be one or more of the transceivers 354. The transceiver 1310 is coupled to one or more antennas 1320, which may be the communication antennas 352.

The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1364. In addition, the transceiver 1310 receives information from the processing system 1314, specifically the transmission component 1370, and based on the received information, generates a signal to be applied to the one or more antennas 1320.

The processing system 1314 includes one or more processors 1304 coupled to a computer-readable medium/memory 1306. The one or more processors 1304 are responsible for general processing, including the execution of software stored on the computer-readable medium/memory 1306. The software, when executed by the one or more processors 1304, causes the processing system 1314 to perform the various functions described supra for any particular apparatus. The computer-readable medium/memory 1306 may also be used for storing data that is manipulated by the one or more processors 1304 when executing software. The processing system 1314 further includes at least one of the reception component 1364, the transmission component 1370, the TCI control component 1376, and the data processing component 1378. The components may be software components running in the one or more processors 1304, resident/stored in the computer readable medium/memory 1306, one or more hardware components coupled to the one or more processors 1304, or some combination thereof. The processing system 1314 may be a component of the UE 350 and may include the memory 360 and/or at least one of the TX processor 368, the RX processor 356, and the communication processor 359.

In one configuration, the apparatus 1302/apparatus 1302' for wireless communication includes means for performing each of the operations of FIGS. 10, 11, and 12(A)-(B) that are performed by a UE. The aforementioned means may be one or more of the aforementioned components of the apparatus 1302 and/or the processing system 1314 of the apparatus 1302 configured to perform the functions recited by the aforementioned means.

As described supra, the processing system 1314 may include the TX Processor 368, the RX Processor 356, and the communication processor 359. As such, in one configuration, the aforementioned means may be the TX Processor 368, the RX Processor 356, and the communication processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   receiving, at a time point, downlink control information (DCI) scheduling two or more downlink data channels;
   receiving, within a threshold processing time from the time point, a first control signal in a first control resource set (CORESET) according to a first transmission configuration indication (TCI) state, the threshold processing time being allocated for the UE to decode the downlink control information; and
   receiving, subsequent to the first CORESET, data according to the first TCI state (a) until an end of the threshold processing time when a second CORESET in which the UE is configured to receive a second control signal does not exist in the threshold processing time or (b) until the second CORESET when the second CORESET exists in the threshold processing time.

2. The method of claim 1, wherein the second CORESET exists in the threshold processing time and the second control signal is configured to be received according to a second TCI state, the method further comprising:
   receiving the second control signal in the second CORESET according to the second TCI state.

3. The method of claim 2, further comprising:
   receiving, subsequent to the second CORESET, data according to the second TCI state (a) until the end of the threshold processing time when a third CORESET in which the UE is configured to receive a third control signal does not exist in the threshold processing time or (b) until the third CORESET when the third CORESET exists in the threshold processing time.

4. The method of claim 1, further comprising:
   buffering the received data during the threshold processing time; and
   locating, after the threshold processing time, the two or more downlink data channels in the buffered data.

5. A method of wireless communication of a user equipment (UE), comprising:
   receiving, at a time point, downlink control information (DCI) scheduling two or more downlink data channels each to be received according to two or more transmission configuration indication (TCI) states;
   determining a first set of TCI states from a number of sets of TCI states that are activated at the UE, wherein each set of the number of sets corresponds to a respective codepoint and the first set has a codepoint that is the lowest among sets of TCI states each containing two or more TCI states; and
   receiving, within a threshold processing time from the time point, data according to a first TCI state and a second TCI state both contained in the first set, the threshold processing time being allocated for the UE to decode the downlink control information.

6. The method of claim 5, further comprising:
   buffering the received data during the threshold processing time; and
   locating, after the threshold processing time, the two or more downlink data channels in the buffered data.

7. A method of wireless communication of a user equipment (UE), comprising:
   receiving, at a first time point, first downlink control information (DCI) from a first transmission and reception point (TRP);
   receiving, at a second time point, second DCI from a second TRP from a second TRP;
   receiving, within a first threshold processing time from the first time point, a first control signal in a first control resource set (CORESET), provided from the first TRP, according to a first transmission configuration indication (TCI) state, the first threshold processing time being allocated for the UE to decode the first DCI;
   receiving, within a second threshold processing time from the second time point, a second control signal in a second CORESET, provided from the second TRP, according to a second TCI state, the second threshold processing time being allocated for the UE to decode the second DCI;
   receiving, subsequent to the first CORESET, data according to the first TCI state (a) until an end of the first threshold processing time when a third CORESET in which the UE is configured to receive a third control signal does not exist in the first threshold processing time or (b) until the third CORESET when the third CORESET exists in the first threshold processing time; and
   receiving, subsequent to the second CORESET, data according to the second TCI state (a) until the end of the second threshold processing time when a fourth CORESET in which the UE is configured to receive a fourth control signal does not exist in the second threshold processing time or (b) until the fourth CORESET when the fourth CORESET exists in the second threshold processing time.

8. The method of claim 7, wherein the third CORESET exists in the first threshold processing time and the third control signal is configured to be received according to a third TCI state, the method further comprising:
   receiving the third control signal in the third CORESET according to the third TCI state.

9. The method of claim 8, further comprising:
   receiving, subsequent to the third CORESET, data according to the third TCI state (a) until the end of the first threshold processing time when a fifth CORESET in which the UE is configured to receive a fifth control signal does not exist in the first threshold processing time or (b) until the fifth CORESET when the fifth CORESET exists in the first threshold processing time.

10. The method of claim 7, further comprising:
   buffering the received data during the first and the second threshold processing time; and
   locating, after the first and the second threshold processing time, the two or more downlink data channels in the buffered data.

* * * * *